COMMUNICATION SYSTEM WITH ALTERNATE DATA LINK

Filed Dec. 29, 1964 Sheet 1 of 9

INVENTOR
J. C. EWIN
BY
S E Hollander
ATTORNEY

COMMUNICATION SYSTEM WITH ALTERNATE DATA LINK

COMMUNICATION SYSTEM WITH ALTERNATE DATA LINK 3,420,958

COMMUNICATION SYSTEM WITH ALTERNATE DATA LINK

James C. Ewin, Holmdel, N.J., assignor to Bell Telephone Laboratories, Incorporated, New York, N.Y., a corporation of New York Filed Dec. 29, 1964, Ser. No. 421,780
U.S. Cl. 179—18 8 Claims
Int. Cl. H04m 3/00

ABSTRACT OF THE DISCLOSURE

A line concentrator switching system is disclosed comprising a remote switching unit connected to a central office by speech trunks and a normal signaling path. The path is utilized for conveying control signals to direct establishment of connections from stations served by the remote unit to the speech trunks via a switching network of the unit. Equipment is disclosed for detecting a failure of the normal path and for establishing an emergency path via the general telephone network facilities. The latter equipment includes a repertory dialer for outpulsing a directory number followed by a verification code for controlling the establishment of the emergency path. The verification code both controls switching equipment for completing the emergency path and also prevents inadvertent access to the remote unit by subscribers of the general telephone facilities.

This invention relates to communication systems and more particularly to communication systems including remote switching units served over control or data links from a distant controlling unit or central office.

Recent departures in telephone system switching technology have dictated the remote disposition of switching circuitry at locations distant from the conventional telephone office. For example, remote line concentrators are utilized to reduce the costs of "outside plant" (equipment "outside" the central office) by connecting a relatively larger number of substation lines over a smaller number of trunks to a telephone central office. A remote switching unit is utilized to connect a service requesting line to an idle trunk under control of the central office. Customarily, the information for governing the operation of the remote switching unit and related equipment at the central office is transferred in both directions over a data link or control trunk. Reference may be made, for example, to my Patent 3,022,382 of FIG. 20, 1962, for a description of a remote concentrator utilizing control trunks for the transmission of information to and from the telephone office. It will be noted therein that the remote switching unit is deprived of any substantial autonomy and must rely on the central office to guide appropriate connections between lines and trunks at the remote unit. This information is derived almost exclusively from signals transferred over the control pairs.

It is apparent therefore that the failure or malfunction of the control pairs or data link isolates the remote switching unit from the source of control information and, in consequence, renders the unit largely inoperative so far as the processing of additional connections through the remote unit is concerned. Viewed in this perspective, it is apparent that the failure of a data link is a catastrophic event in a telephone concentrator system.

Insofar as the "slaving" of the remote switching unit to the control equipment in the central office is concerned, a related situation obtains in the case of distributed switching equipment. For example, in the remotely located primary switching stage described in detail in Patent 3,217,-109 of Nov. 9, 1965 to C. Abert, the remote line link frame is entirely dependent on intelligence reposed in the common equipment at the central office. In consequence, the data link which couples the remote switching stage to the central office performs the vital function of conveying control signals between the central office and remote unit necessary for the operation of the latter. Here again, it needs no elaboration to infer the crippling consequences to the remote unit of the failure of the data link.

It is therefore an object of this invention to provide for the convenient substitution of an alternate data link over any convenient switched path between the remote switching unit and the controlling equipment distant from such unit.

Past efforts in this area have included the classical "standby" data link or substitute data link which is dedicated exclusively to such function. In the event of the failure of the primary data link, a substitute link is automatically or otherwise switched in place of the primary link.

Although completely operative and useful, the disadvantages of such an arrangement are manifest and include the expense of providing dual facilities whereas only a single link is in use at any one time.

To those familiar with the telephone art, a still greater hazard is evident in the utilization of traditional standby data links. The threat which obtains is derived from the fact that in practice the primary data link and the substitute data link may physically be located in the same cable run. In consequence, an injury or fault on the cable which disables the primary data link may, in view of the proximity of the substitute data link, also impair the substitute data link.

Thus, the traditional approach to substitute data links which is predicated on the provision of a known dedicated path results in a number of significant limitations to the continuance of service at the remote switching unit in the event of failure of the primary data link.

An additional object of this invention is to provide for the extension of a substitute data link through the use of conventional switched channels selected in response to the transmission of coded signals representative of the remote signaling network location.

Still another object of this invention is to provide for the transmission of coded data representative of the remote unit signaling circuit under control of a memory device.

A further object of this invention is to allocate a telephone switching address in the form of a directory number to a remote switching unit signaling network to facilitate the extension of a path thereto over conventional switched channels.

A further object of this invention is to provide for the transmission of a verification code as a portion of the directory number address of the remote signaling equipment to prevent unauthorized seizure of a remote switching network.

These and other objects and features of the invention are achieved in a specific illustrative embodiment in which a data link or signaling channel of the type disclosed in my Patent 3,022,382 of Feb. 20, 1962, includes facilities for providing an alternate data link over any available switching channel.

In accordance with the concentrator arrangement described in the above-referred-to patent, a remote switching unit is utilized to concentrate a relatively larger number of lines terminated at such unit over a smaller number of trunks extending to a control switching unit at the office. The control unit at the office provides a deconcentration stage of switching in which the trunks are "fanned-out" to a number of terminals equal in number to the substations connected to the remote unit. These terminations at the control switching unit are thereupon extended to the conventional central office line terminations to which the remote substation lines would have been connected if directly connected to the office, rather than concentrated.

Conventionally, as shown in my prior patent, the signaling trunks are utilized to deliver information between the remote unit and the control unit at the central office. Both units are dependent on the continued effective functioning of the signaling channels to perform the required operation of coupling service requesting lines and line terminations to appropriate idle trunks.

In the present arrangement, facilities are provided which are responsive to a failure of the signaling channels to initiate the extension of an alternate data link over any conventional switched path between the central office control unit and the remote switching unit. As an illustration it may be assumed that the office at which the concentrator control unit is located, is the CHelsea 3 exchange. In accordance with the present invention the signaling facilities at the control unit are provided with wholly conventional line terminations in the CHelsea 3 office so that the emergency path can be established via the general telephone network facilities. These terminations are identical to those that exist for ordinary telephone substations.

Moreover, the signaling facilities at the remote switching unit are provided with appearances on the crosspoints of the remote unit itself. Both the signaling facilities at the control unit and at the remote switching unit may be transferred from their normal connection to the signaling channel which couples them in the usual manner described in my prior patent, to their respective appearances in the CHelsea 3 office in the case of the control unit signaling facilities and to the matrix crosspoints in the case of the remote unit signaling facilities.

As will be shown herein, this transfer procedure enables the signaling facilities to re-establish an emergency connection therebetween over any conventional speech trunks which ordinarily would be used for speech connections between the two locations. A significant aspect of the instant arrangement relates to the assignment of an address index to reach the signaling facilities at the remote switching unit which in all respects is comparable to a telephone directory number. Thus the signaling facilities at the remote unit may be provided with the directory designation LT1–3370 and a verification code of 4499, as explained herein.

In response to the failure of the conventional or primary data link, facilities are energized for transferring the signaling equipment at the control unit and the remote unit to their respective emergency terminations, i.e., line terminations in the CHelsea 3 office and crosspoints on the remote switching network.

In further response to the failure of the primary data link, a preset automatic or repertory dialer is energized at the control unit of the concentrator to deliver signals over the assigned termination in the CHelsea 3 office indicative of the directory number LT1–3370 representative of the tie line to the signaling equipment at the remote switching unit. The equipment in the CHelsea 3 office which may illustratively be of any conventional type operates in response to the dialed digits to extend a connection over available trunks to the LT1 exchange. At the latter office, the termination LT1-3370 is coupled over a tie line to a conventional PBX. The latter includes, illustratively, nine PBX lines which are terminated on the network of the remote concentrator unit. In response to the extension of the connection to the PBX, a second dial tone or other signal is returned to the repertory dialer which thereupon proceeds to dial a confidential verification code, e.g., 4499, to control the PBX equipment to extend a path therethrough to one of the nine lines connected to the remote concentrator unit. Transmission of the code by the repertory dialer in order to extend the connection assists in prevention of unauthorized seizure of emergency data link equipment.

Additional facilities in the remote switching unit effective in response to the seizure of an idle one of the PBX lines control the operation of a vertical magnet to couple the signaling facilities on the vertical termination to the energized PBX line on a horizontal termination. At this time a complete path extends from the control unit via the CHelsea 3, LT1 and PBX switching trains. For reasons explained herein in detail, a second operation is thereupon initiated to extend a call to the address LT1–5620 and another vertical magnet is operated in the remote unit to couple the signaling facilities to a second available PBX line. Subsequently, the concentrator control equipment is effective in response to additional service requests or terminating calls to extend connections to and from lines at the remote concentrator in consequence of signals transmitted between the signaling facilities over the emergency alternate data link.

It is significant to observe that the above arrangement for providing an emergency alternate data link does not contemplate the use of any portion of the trunk switching path exclusively for emergency data link purposes. In short, the PBX lines which extend to the remote concentrator are normally utilized by customers at the PBX. The trunks between the CHelsea 3 and LT1 offices are available for any conventional traffic therebetween, and the tie lines between the LT1 office and the private branch exchange are similarly available to extend calls to PBX customers.

These and other objects and features of the invention may be more readily apprehended from an examination of the following specification, appended claims and attached drawing in which:

FIG. 1 shows a block diagram of a portion of the remote network of a concentrator system with an appearance of the signaling conductors on the crosspoint network;

FIG. 1A includes a block diagram of the central office portion of the network and illustrates the appearance of the signaling conductors as line terminations in the office;

Figures 2, 9:
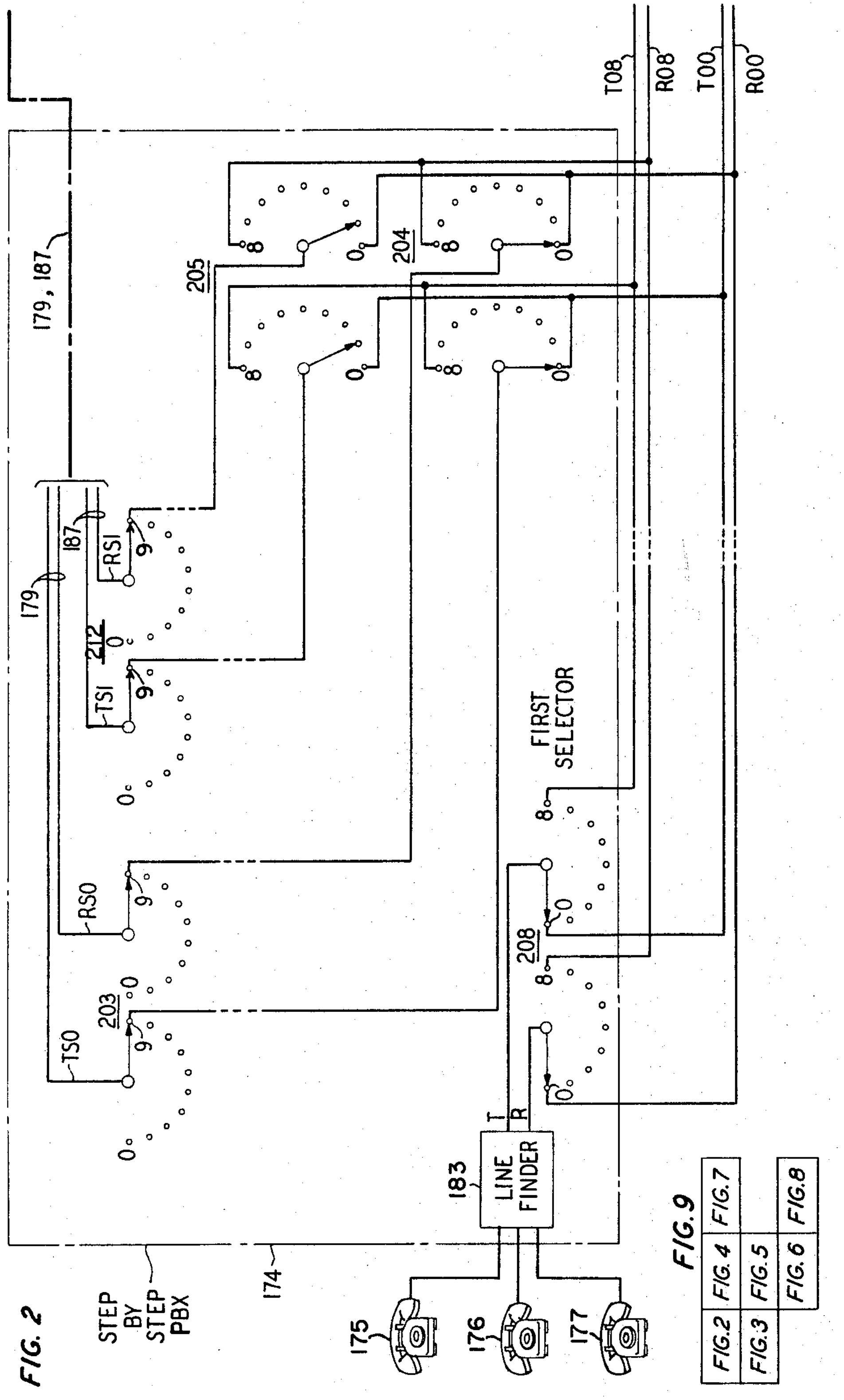
FIG. 2 shows a portion of a step-by-step PBX from which outgoing lines extend to the remote concentrator network.
Figure 5:
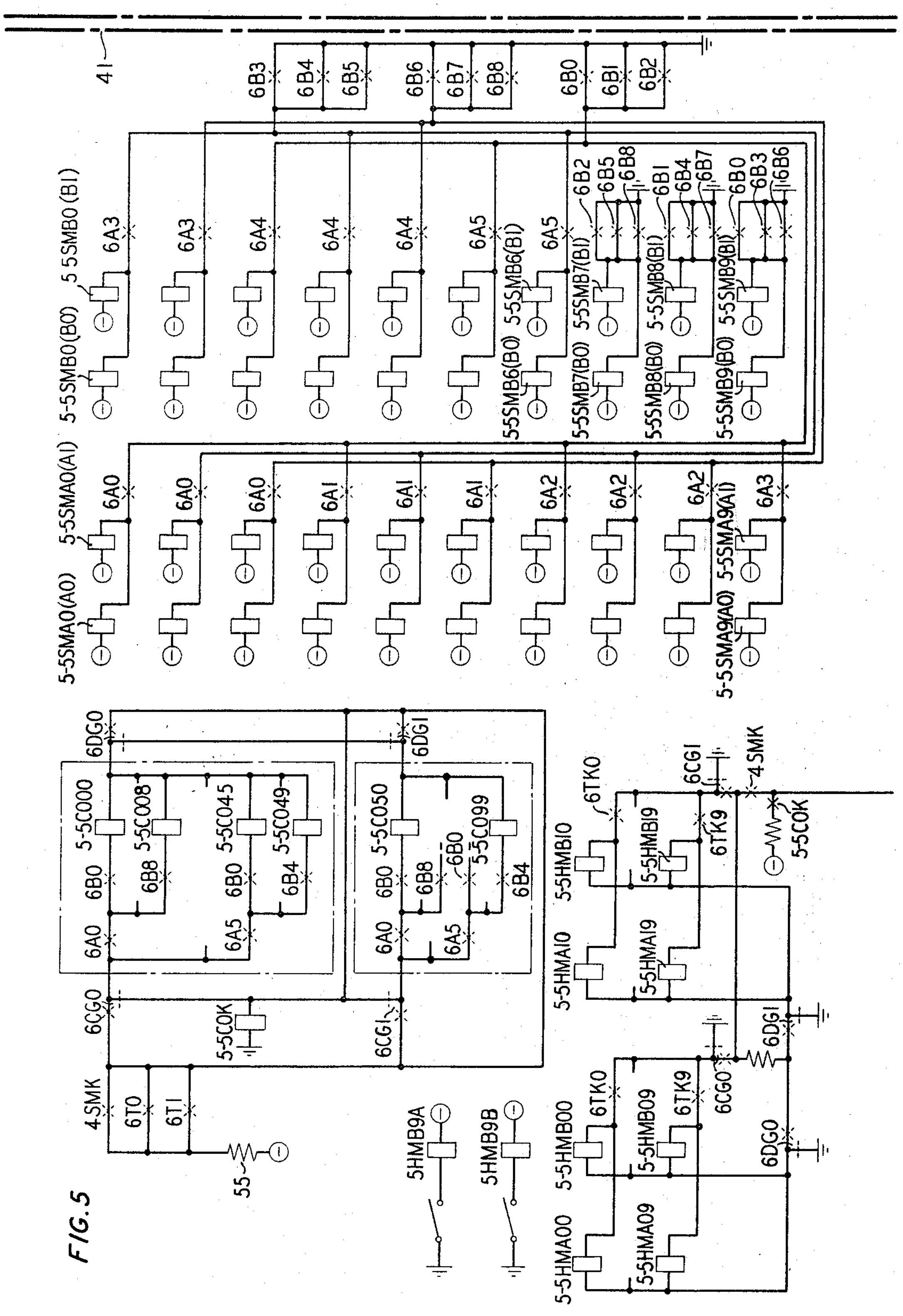
Figure 6:
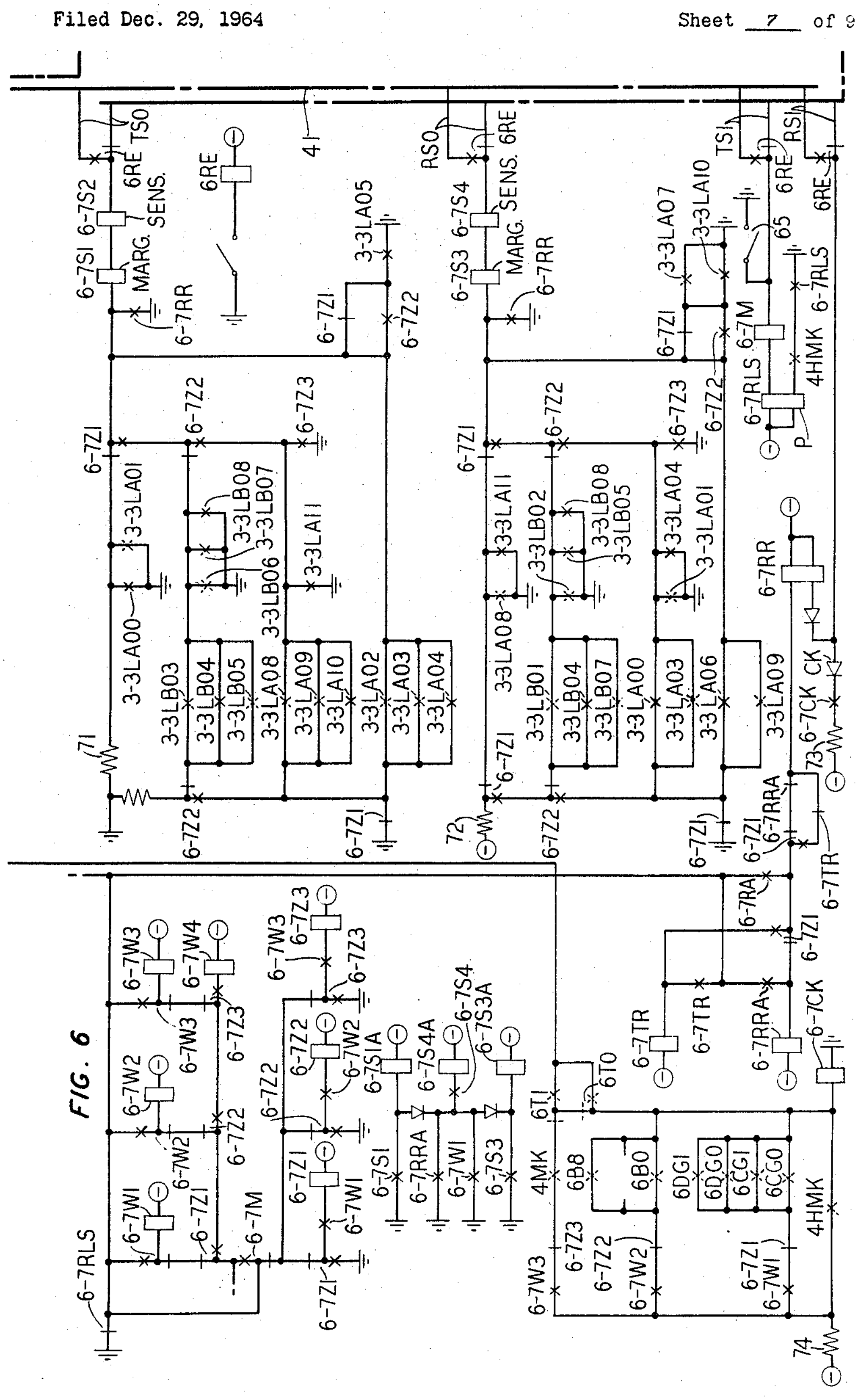
Figure 7:
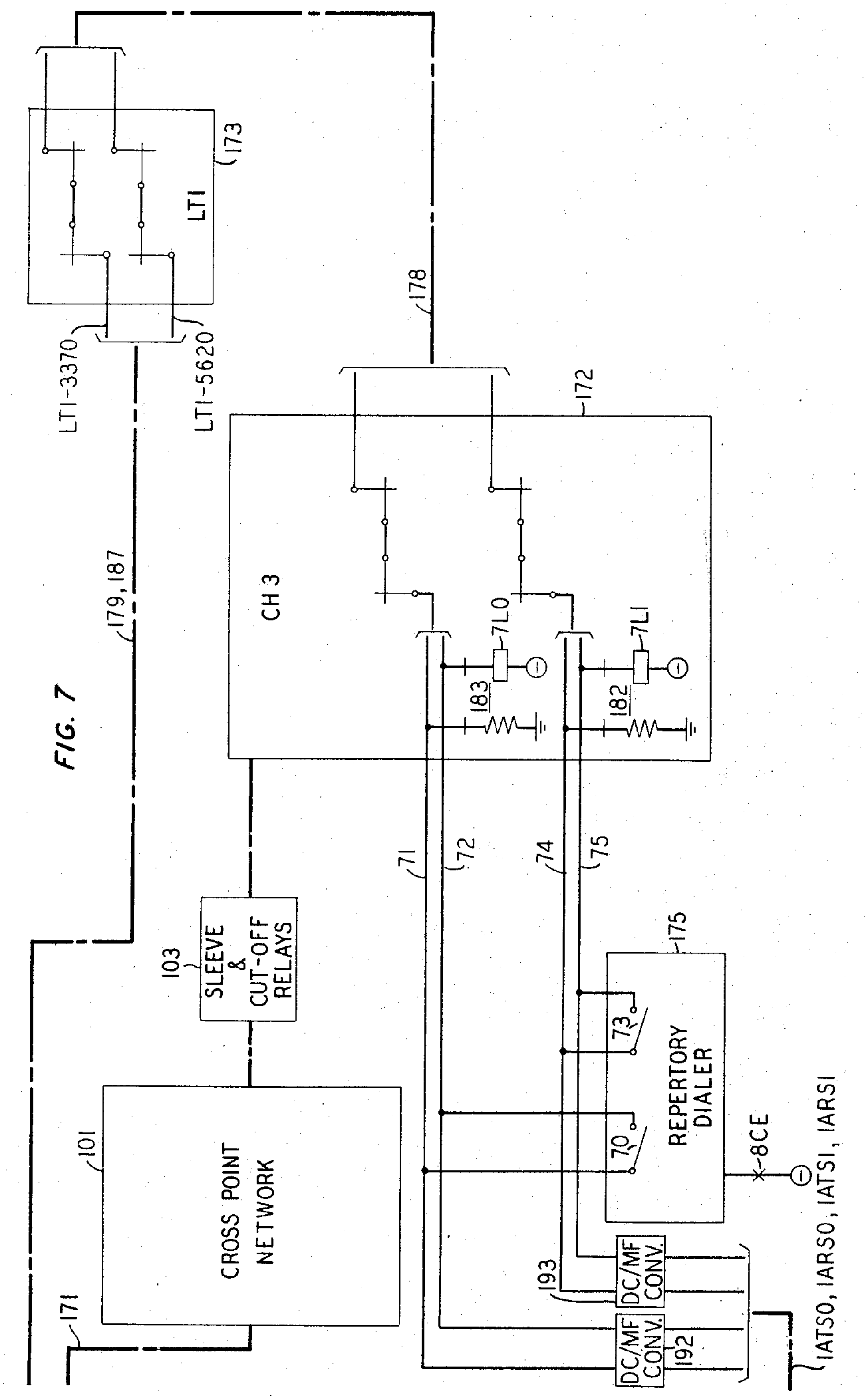
Figure 8:
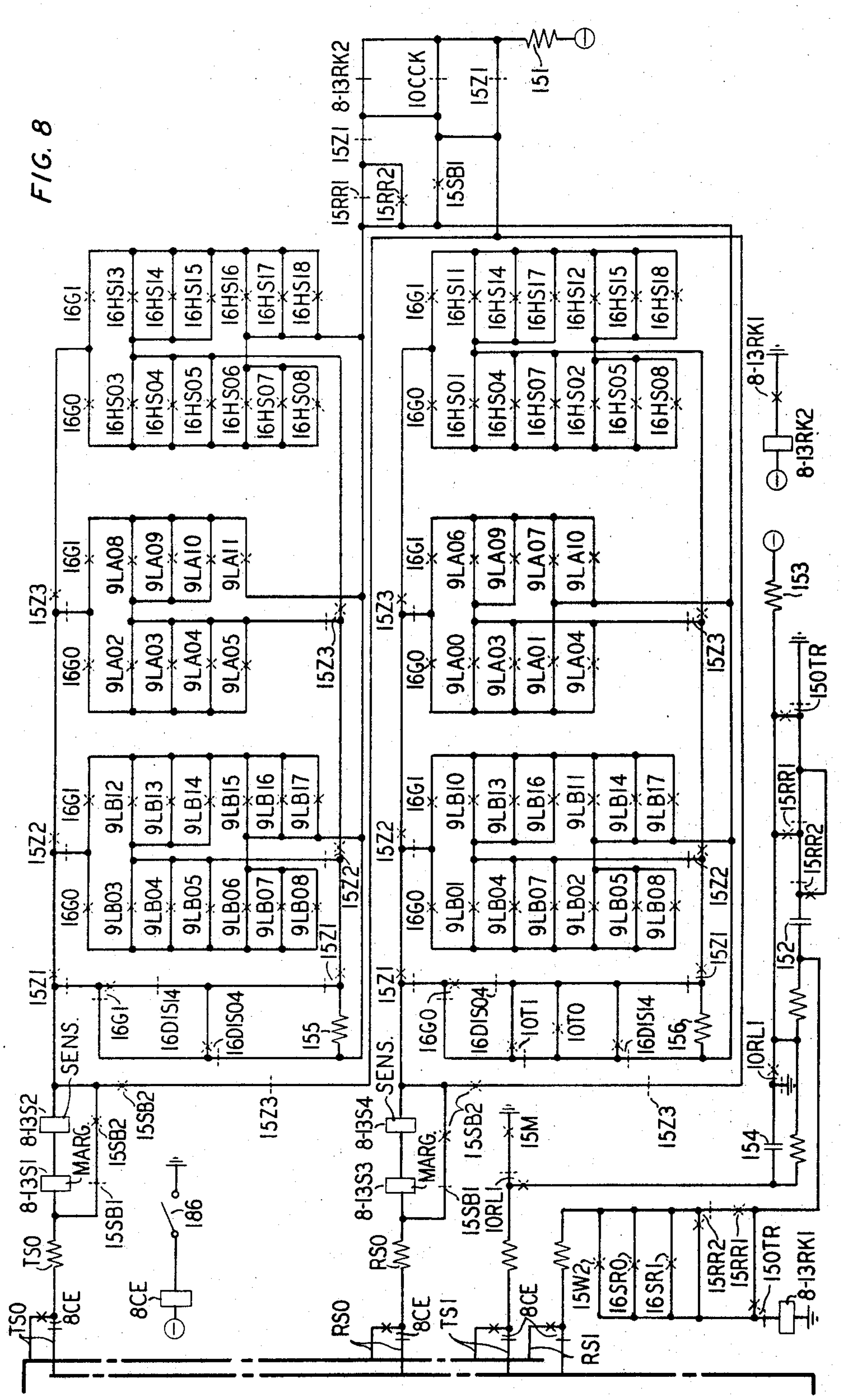

FIG. 5 includes select magnet and hold magnet operating circuits;

FIG. 6 includes the sequence control circuit and the remote portion of the signaling circuit;

FIG. 7 includes an outlying diagram of the control unit crosspoint network, the repertory dialer and the line termination appearance of the signaling network;

FIG. 8 includes the central office or controlled unit portion of the signaling facilities; and FIG. 9 is a key diagram showing the arrangement of FIGS. 2–8.

GENERAL DESCRIPTION

Figure 1:
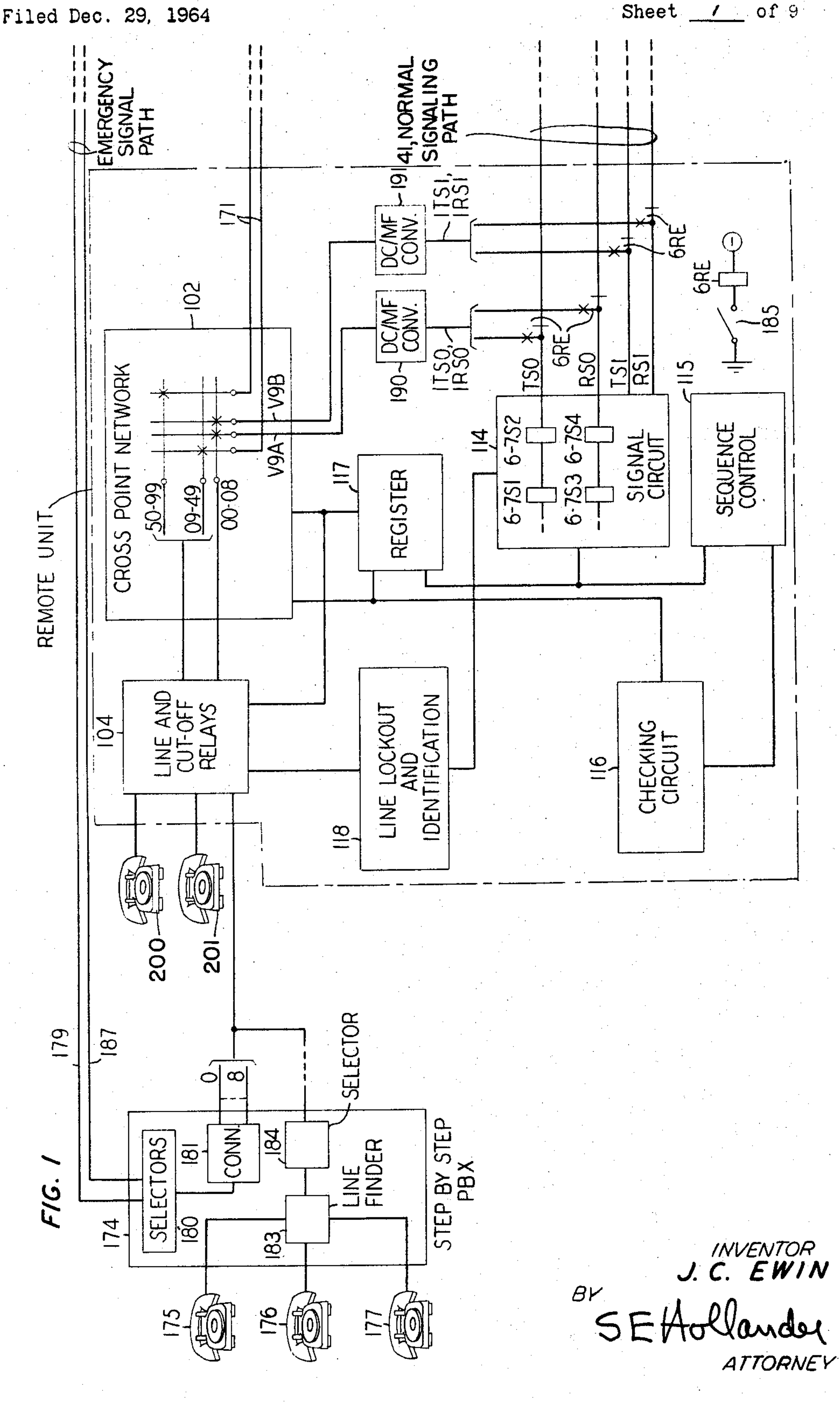
Figure 1A:
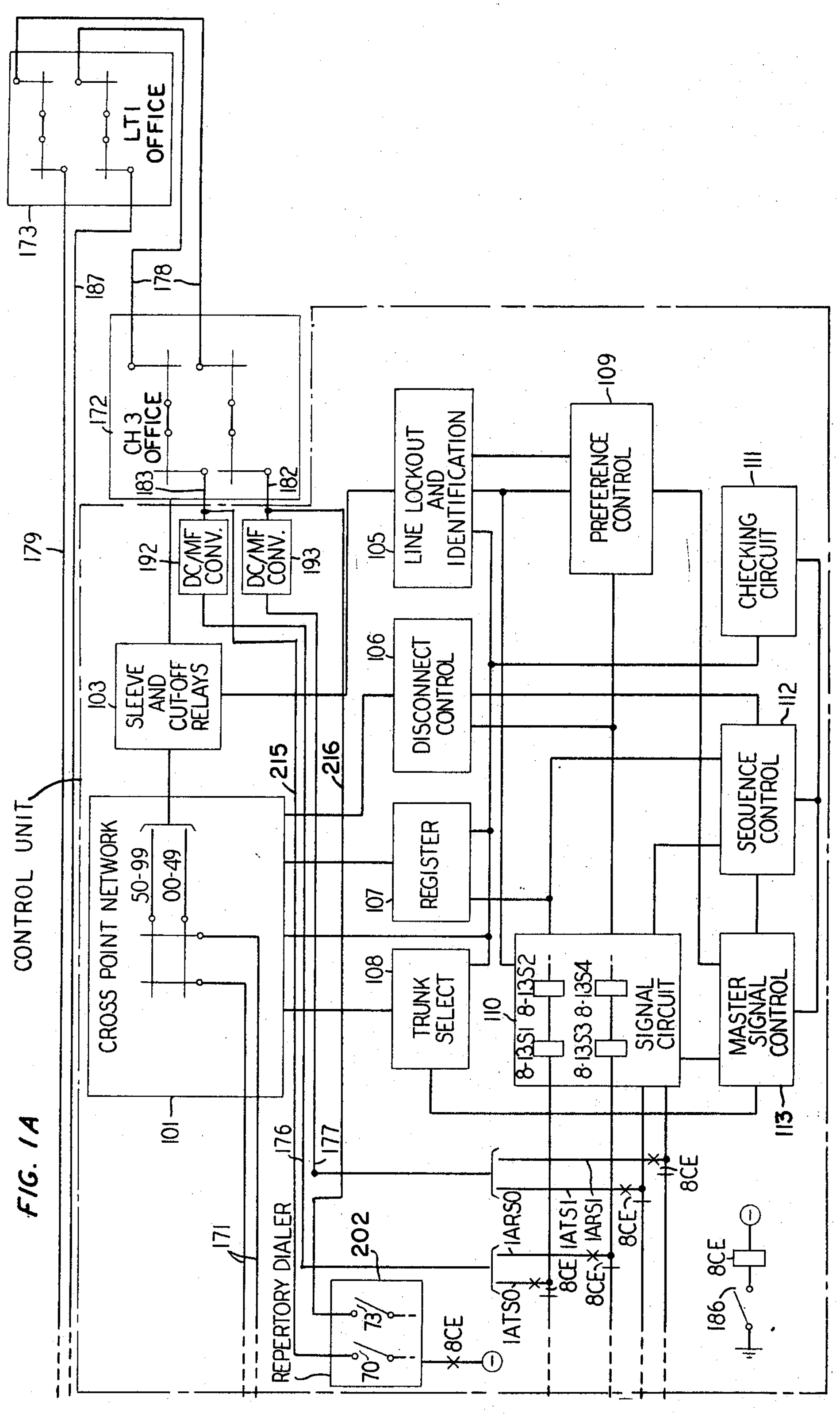

In FIGS. 1 and 1A a concentrator of the universal type is shown including a remote unit and a control unit. The concentrator units are coupled over a plurality of trunks 171 less in number than the number of lines served by the concentrator. The substation lines are terminated on the horizontals of the crosspoint network 102 at the remote unit and include individual line and cutoff relays 104 for each line.

At the central office the trunks 171 are "fanned" out through crosspoint network 101 of the control unit into a number of line terminations equal in number to the number of lines which terminations are in turn extended to the sleeve and cutoff relays 103. Thereafter, each of the sleeve relays is further extended to a line termination in the office 172 unique to each of the lines. The latter terminations are the same terminations which the lines would have been connected to if directly connected to the office. Also shown in FIG. 1A in addition to the office 172 on which the concentrator control unit "homes," and which bears the exchange designation CH3, is a distant office 173 which bears the exchange code designation LT1. Both central offices 172 and 173 may be of any conventional type.

In FIG. 1 a private branch exchange 174 which is illustratively of a step-by-step type is shown. The exchange 174 may be of the general type referred to as the Bell System 701A dial PBX modified as shown. Reference may be made to the "Survey of Telephone Switching," Pacific Telephone and Telegraph Company, 1956, pages 227 et seq. for a general description of a 701A dial PBX, and to Patent 2,289,895 of H. H. Abbott of July 14, 1942 for a step-by-step type of PBX. Reference may also be made to the Bell Laboratories Record, volume 8, page 36 for a discussion of the 701A PBX. A pair of trunks 179, 187 extend from office 173 to PBX 174 and are in the nature of "tie lines." Moreover, nine outgoing lines extend from PBX 174 to the remote unit of the concentrator. A relatively larger number of PBX extensions 175, etc., of which only three are shown, are connectable in a conventional manner to the PBX lines 0–8 extending to the remote unit. Additional control equipment including sequence control 115, preference control 109, master signal control 113, etc., is utilized in effecting connections between a particular line and a selected idle trunk of the concentrator in a manner explained in detail in my above-referred-to patent.

Significantly, the signal conductors TS0, RS0, TS1 and RS1 in addition to directly coupling the respective signal circuits 110 and 114 have, in the case of the remote unit, appearances on the verticals of the crosspoint network 102 and in the case of the control unit, appearances 182, 183 (with a repertory dialer 202) as conventional lines in the CH3 office.

It will be noted that signal converters 190–193 are utilized to transform the direct current concentrator signals to appropriate multifrequency signals for transmission over the speech trunks. This conversion is performed in a well known manner and may use equipment of the general type employed in the Bell System 4A toll switching system for converting from multifrequency signals to panel call indicator signals. This system is disclosed in part in Patent 2,868,884 of J. W. Gooderham et al. of Jan. 13, 1959. Reference may also be made to Patents 2,564,441 of B. McKim et al. of Aug. 14, 1951, 2,332,912 of G. Hecht et al. of Oct. 26, 1943, 2,288,251 of P. B. Murphy of June 30, 1942 and an article entitled "Signaling Systems for Control of Telephone Switching," by C. Breen et al., Bell System Technical Journal, November 1960, page 1381 and the references therein referred to for DC to MF conversion and vice versa.

It is further understood that various other conversion arrangements well known to those skilled in the art may be used, or alternatively it may be assumed that a continuous direct current path is closed through offices 172 and 173 and PBX 174 (after the repertory dialer 202 has performed its function in extending the connection) to obviate the need for signal conversion.

The provision of terminations for the signal conductors on the crosspoint network 102 at the remote unit and on conventional line terminations in the CH3 office at the distant end provide a degree of flexibility in the event of failure of the signal conductors which permits the transmission of signal data necessary for concentrator operation over a circuit other than the signal conductors TS0, RS0, TS1 and RS1. Briefly, this circuit extends at the control unit over the contacts of relay 8CE, conductors 1ATS0, 1ARS0, 1ATS1 and 1ARS1, cables 176 and 177, converters 192, 193, line terminations 182 and 183 and a switching train of the CH3 office, trunk 178, the switching train of the LT1 office, tie lines 179, 187, switching train of PBX 174 and two idle PBX lines in the line group 0–8 extending to the crosspoint network 102 via line and cutoff relay 104, converters 190, 191 and finally over conductors 1TS0, 1RS0, 1TS1 and 1RS1 and contacts of relay 6RE to signal circuit 114.

The manner in which the above designated path is automatically effected in the event of failure of the signal conductors may for example be predicated on the continued operation of sensitive relays 6–7S2, 6–7S4, 8–13S2, 8–13S4. If any one of the sensitive relays is released, during a quiescent period of concentrator activity relays 6RE and 8CE, the transfer relays at the remote unit and control unit are operated as shown symbolically by manual switches 185, 186. Moreover, the contacts of relay 8CE extend a path for the operation of the repertory dialer circuit 202 which is conditioned to automatically dial the telephone directory number of the line termination in the LT1 office to which the tie line 179 extending to PBX 174 is connected.

In summary, an alternate or emergency signaling path may be established via a remote office and utilizing speech trunks which in the absence of an emergency are conventionally used by calling customers. A singular benefit of this type of arrangement is that the specific path between the signal circuit at the control unit and the signal circuit at the remote unit is, in fact, unknown at the time the necessity for alternate routing of the signal information occurs. Thus, although direct trunks are shown between the CH3 office 172 and the LT1 office 173 for purposes of simplicity, it is well known that other "alternate" routing arrangements conventionally exist between central offices and may include a tandem office (not shown) between the CH3 office and the LT1 office. Thus in certain instances, the path via a tandem office or succession of tandem offices (not shown) is automatically selected if all direct route trunks between the CH3 office and the LT1 office are occupied.

Moreover, the emergency signaling path may be maintained indefinitely or until the signaling trunks TS0, RS0, TS1 and RS1 are again functioning properly.

GENERAL DESCRIPTION OF OPERATION—NORMAL SIGNALING PATH

As indicated briefly above, two combinations of sensitive and marginal relays and the application of three current levels to the signal conductors TS0, RS0, TS1 and RS1 are utilized to provide nine distinct signals for digital transmission.

On an originating call the signal relays are operated in accordance with information stored in line lockout circuit 118, as adverted to above, which in turn is responsive to the operation of a particular line relay in circuit 104. Also as explained, the character of operation of the signal relays provides that signal circuits 114 and 110 be energized simultaneously to reflect the appropriate (line) information, which information is thereafter stored in register circuits 117 and 107.

On a terminating call, information identifying the called line originates in line lockout circuit 105 which in turn responds to the operation of a particular sleeve relay in circuit 103. At this time, signal circuits 110 and 114 are again energized simultaneously to store the called line information in registers 117 and 107. The information is transmitted sequentially in four signaling sequences under control of the sequence control circuitry and the information is adequate to identify the line requesting service and the trunk selected to serve the call.

In general, conductors TS0 and RS0 are utilized to furnish the line and trunk information above described. However, since trinary signaling is employed only nine distinct combinations are possible and therefore additional facilities are used to identify a tenth one of trunks 171.

This latter information is transmitted over signal pair TS1 and RS1 which latter is also utilized for various control functions including advancing the sequence control circuits 115 and 112 and for concentrator release indications.

Referring to FIG. 1 when a call is originated at substation 176 of PBX 174, a path is extended over line finder 183 to a first selector 184. The latter is coupled to the nine outgoing PBX lines which are terminated at the remote crosspoint network 102. In accordance with conventional practice, the customer at substation 176 dials a predetermined digit, e.g. 9, to cause the selector to step to the level on which the outgoing PBX lines are terminated and to moreover cause the selector, also conventionally, to hunt for an idle outgoing PBX line. It will be assumed that outgoing line 0 is available whereupon the relay unique to that line at the remote unit network (4–2L00) is operated. In turn this results in the operation of two identifying relays in the line lockout circuit 118. The latter supply information to the signal circuitry indicative of the calling line identification and also the class of call (service request, terminating or disconnect). This information is transmitted sequentially and stored in the corresponding register circuits 117 and 107. The sequencing of the signal transmission is under control of the W–Z relays in sequence control circuit 115. When the information transmission from the remote unit to the control unit relative to the line identity is complete, the direction of signal information is reversed and the signal circuits 110 and 114 are operated in accordance with information from the trunk select circuit 108 to register the trunk identification in the registers 117 and 107.

Priorly, the appropriate select magnets in the crosspoint networks 102 and 101 have been operated. When the trunk information has been recorded and the appropriate checking operation has been completed in the checking circuits 111 and 116, a circuit is completed for operating the trunk hold magnets in the networks. This completes the operation of the common equipment in the concentrator and prepares the control unit and remote unit for release. When release is accomplished, the line is connected to the trunks at both units through magnetically latched hold magnets. The only other relays which remain energized are the magnetically latched cutoff relays. At this time, substation 176 is connected to a termination in the CH3 office which is energized in a manner identical to that which would obtain if the line were directly connected to that termination. In consequence, a dial pulse register is energized at the CH3 office and the customer at substation 176 receives dial tone (second dial tone, the initial dial tone preceded dialing of the digit 9) and may proceed to dial the digits of the called number. Subsequent operations in the CH3 office are wholly conventional and need not be elaborated.

GENERAL DESCRIPTION OF OPERATION—EMERGENCY SIGNAL PATH

As will be explained herein in detail, relays 6–7S2, 8–13S2, 6–7S4 and 8–13S4, the sensitive relays, are energized even during inactive periods of concentrator operation as a check on the continuity of the signal paths. If at any time other than during signaling operations the sensitive relays are released, relays 6RE and 8CE are operated to open the normal path between the signal circuits and instead to transfer the remote signal circuit 114 to the verticals on crosspoint network 102 and to transfer the control signal circuit 110 to the line terminations 182 and 183 in the CH3 office via cables 176, 177 and converters 192, 193. For simplicity, the operation of relays 6RE and 8CE is shown symbolically by manual switches 185 and 186. At this time additional contacts of relay 8CE are utilized to energize repertory dialer 202 which transmits digital signals over cables 215 and 216 indicative of a termination in the LT1 office unique to the tie line 179 to PBX 174. For example, the dialer 202 may transmit digits equivalent to the directory number LT1–3370. The CH3 office and the LT1 office will extend a path to this termination in an entirely conventional manner which need not be described. Having reached the tie line extending to PBX 174, the selector 180 at the PBX is energized to transmit a further dial tone which conditions the repertory dialer to dial a verification code, e.g. 4499, which further extends the connection over an intermediate train and a connector circuit 181 which hunts for an outgoing PBX line in the line group 0–8. It will be assumed that line 1 (not shown) is available, line 0 having already been seized by the customer at substation 176. At this time the energization of line 1 extends a path through the line and cutoff relays 104 to the assigned horizontal level in the crosspoint network 102.

Subsequently the repertory dialer extends a further connection over conductors 177 and converter 193 to a second termination in the LT1 office coupled to tie line 187 extending to PBX 174. This termination may, for example, have the directory number LT1–5620. When the termination is reached after the repertory dialer transmits the appropriate digits, another selector in PBX 174 responds to transmit the second dial tone to the repertory dialer which replies by dialing the verification code 4499 to extend the connection to another hunting connector which operates to seize an available PBX line, illustratively line 2, extending to its unique horizontal termination on the crosspoint network 102. Thereafter, hold magnets 5HMB9A and 5HMB9B are operated by remote unit circuitry independently responsive to a failure of the normal signaling path to operate the crosspoints which couple the selected PBX lines to the signal conductors. The select magnets are priorly operated in accordance with the specific identification of the seized PBX lines by circuit 118. At this time a path now extends over an emergency route from signal circuit 110 at the control unit, conductors 1ATS0, 1ARS0, 1ATS1, 1ARS1, conductors 176 and 177, converters 192, 193, terminations 182 and 183, cable 178, parallel switch trains in the LT1 office, tie lines 179 and 187, parallel switch trains (not shown) in PBX 174, outgoing PBX lines 1 and 2 (not shown), crosspoint contacts of network 102, converters 190, 191, conductors 1TS0, 1RS0, 1TS1 and 1RS1 and the contacts of relay RE to signal circuit 114 thereby re-establishing a complete path between the signal circuits and permitting subsequent signaling operations to be executed over this path.

It is understood that facilities may be provided at the line concentrator for further guaranteeing prevention of unauthorized or accidental seizure of the remote concentrator unit by customers of the private branch exchange. These facilities may illustratively include switch trains similar to those shown in FIG. 2 which are responsive to the verification code directory number designation. Under these conditions, similar well-known arrangements would be provided for transmitting a third sequence of signals to a switch train at the line concentrator which sequence represents a further verification code unknown to the PBX customers to effectuate final extension of the alternate signaling path.

MAJOR COMPONENTS

*Signal circuitry*

It will be noted herein that, where possible, reference designations have been employed which facilitate comparison with my prior patent. Thus in the designation "8–13S1," "13S1" is the same relay as in my prior patent and "8" is the figure in the present drawing in which the relay appears.

It is apparent that the control unit is located at the central office and is coupled to the remote unit over a plurality of trunks 171 which illustratively may be 20 in number and that the units are also coupled by signal conductors TS0, RS0, TS1 and RS1.

The signal circuit 110 at the control unit includes two pairs of sensitive and marginal relays 8–13S1 through 8–

13S4. The sensitive relays 8–13S2 and 8–13S4 are arranged to be operated when a minimum current flows on the signaling conductors and the marginal relays 8–13S1 and 8–13S3 include a threshold or "margin" effective to insure that a significantly higher current than that necessary to operate the sensitive relays has been supplied. Similar facilities are available in the remote unit (FIG. 8) which includes sensitive relays 6–7S2 and 6–7S4 and marginal relays 6–7S1 and 6–7S3. Complementary operation of the signal circuits in the remote and control units exists whereby the operation of a sensitive relay 6–7S2 over conductor TS0 is joined by the operation of sensitive relay 8–13S2 at the control unit. Similarly, if both sensitive and marginal relays 6–7S1 and 6–7S2 are operated, the corresponding relays 8–13S1 and 8–13S2 are also operated over conductor TS0. In this manner the four relays on each signal conductor are adapted for bidirectional operation in that the signals may originate at the control unit signal circuit of FIG. 8 to convey information to the remote unit signal circuit of FIG. 6 during a terminating call to the remote unit.

In the case of an originating call, the calling line identification will be transmitted from the signal circuit at the remote unit to effect the operation of corresponding relays at the control unit. When the signal circuits are operated, information is transferred to the respective registers 117 and 107 (FIGS. 1 and 1A).

*Master signal control circuit*

The operation of the remote unit and control unit signaling circuits is guarded against conflicts by the master signal circuit 113 (FIG. 1A) which is described in detail in FIG. 9 of my patent.

*Line lockout and line and cutoff circuits*

The line lockout circuit 118 for the remote unit and 105 for the control unit are shown in outline form in FIGS. 1 and 1A. Additional details of line lockout circuit 118 are given in FIG. 3 and will be discussed herein.

To identify a calling line on a service request call, two relays in the line lockout circuit of the remote unit are operated under control of a specific line relay in the group of line and cutoff relays 104. For example operation of relay 4–2L00 results in the operation of a particular relay 3–3LA00 and 3–3LB00 uniquely identifying the calling customer's line.

Similar facilities are available in the line lockout and identification circuit 105 in response to the operation of particular sleeve relays in the group 104 and effectuate the operation of a particular "A- relay" and "B- relay" representative of the line initiating a terminating call. It is seen in FIG. 1A that the sleeve and cutoff relays 103 of the control unit are further extended to conventional existing line circuit terminations in the central office CH3, the latter terminations not being shown.

*Checking circuits*

A checking arrangement is provided as shown in outline form at 116 and 111 (FIGS. 1 and 1A) to verify the accurate operation of the signal circuitry and other equipment in the concentrator. Additional functions are performed by the checking circuitry to insure that the correct hold magnets and trunk relays are operated.

*Trunk selection*

A trunk selecting circuit 108 (FIG. 1A) selects an idle trunk to service a particular call. The circuit includes a plurality of relays individual to the trunks and is utilized for selection of a trunk to be connected and also to be disconnected as explained in detail in my above-referred-to patent. The disconnect control circuit 106 insures that a minimum of four lines from the remote unit will be "cut through" to the central office. This circuit functions to maintain at least four lines from the remote unit cut through at all times even if the lines are inactive.

*Crosspoint networks*

At the remote unit and the control unit, switching facilities are used for concentrating from an illustrative 100 lines to an illustrative 20 speech trunks and deconcentrating at the office to a number of terminations equal in number to the number of concentrated lines. The lines appear on the switch horizontals and the trunks are individual to the switch verticals. The hold magnets utilized are of the magnetic latching type to reduce power drain as explained in my patent.

Moreover, in addition to the connection of the speech trunks to the verticals of the crossbar switches as explained in my patent, I have in the present invention, in addition, coupled the signal trunks to special additional verticals V9A and V9B on the remote crosspoint network over conductors 1TS0, 1RS0, 1TS1 and 1RS1.

*Sequence control circuit*

Groups of "W–Z" relays are arranged at the remote unit and at the control unit and are included within sequence control circuits 115 and 112 which are sequentially operated in a particular order. The operation of the relays (FIG. 4) modifies circuit paths in the signaling and other circuits to permit the progression of the control unit and other circuitry through the steps necessary to complete calls.

*Registry circuitry*

Registration equipment 107 at the control unit and 117 at the remote unit include groups of relays adapted to register information pertinent to a concentrator connection operation. A portion of the contacts on the registration equipment relays at the remote unit and the manner in which they control network switching is shown in greater detail on FIG. 5 and will be explained herein.

DETAILED DESCRIPTION

In the following description only those aspects of the equipment operation essential for a complete understanding of the present invention will be discussed. Reference may be made to my above-referred-to patent for a full description of the ancillary equipment shown in outline form here and for the relay winding connections of the contacts shown in dotted line.

In FIG. 2 a simplified showing of a step-by-step PBX suitable for use in combination with the present invention is indicated. Nine outgoing PBX lines, T00, R00 through T09, R09, are utilized although only two lines are shown. Customers 175–177 represent conventional customers or "extensions" on the step-by-step PBX 174. These customers, which may for example be 60 in number although only three are shown, share a lesser number of PBX lines T00, R00 through T08, R08, which are coupled to horizontals of the crossbar switch of the concentrator remote unit in FIG. 4.

Figure 4:
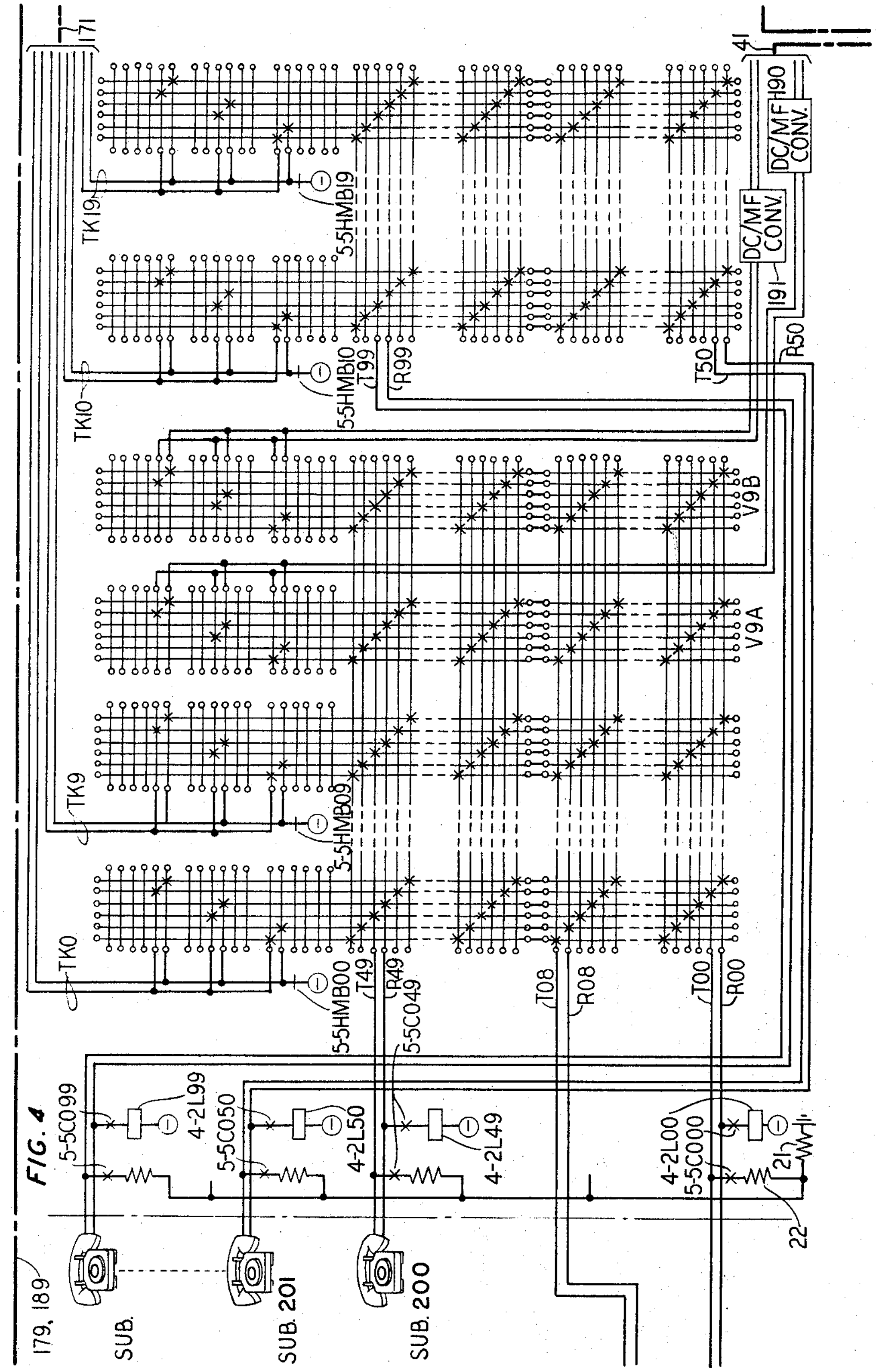
FIG. 4 shows a crossbar remote network indicating the allocation of exclusive vertical paths to the signaling conductors.

Although only three substations are shown on FIG. 4, it is understood that as many as 91 customers may be connected to the horizontals of the crossbar switch of FIG. 4. Also as shown in FIG. 4, the trunk circuits extending to the crosspoint network 101 at the control unit are connected via horizontal "steering" levels which permit any of the first 50 lines to be connected to a first group of trunks TK0–TK9 and the remaining 50 lines to be connected to trunks TK10–TK19.

A significant departure from the crosspoint network described in my above-referred-to patent is the additional two vertical paths V9A and V9B which are utilized to couple conductors TS0, RS0, TS1 and RS1 respectively to the crosspoint network over cable 41. The crosspoint network 101 at the control unit is shown in outline form only and is similar to that described in the above-referred-to patent. As indicated therein, the crosspoint network includes terminations unique to each of the lines at the remote unit, and moreover, an individual sleeve and cutoff relay in the group 103 for each of the lines. The latter are coupled on an individual basis to corresponding conventional line terminations (not shown) in the CH3 office.

The repertory dialer 202 may be of any well-known type, for example that shown in Patents 2,941,043 of J. H. Ham, Jr., et al. of June 14, 1960, and 3,105,121 of J. M. Field of Sept. 24, 1963.

In the idle condition of concentrator operation (no calls in progress) relays 6–7S2 and 8–13S2 are operated over conductor TS0. Moreover, relays 6–7S4 and 8–13S4 are also operated. With respect to relay 8–13S2 a path may be traced from negative battery, resistance 151, contacts of relays 8–13RK2, 15Z1, 15RR1, 16DIS04, 16G1, 15Z1, windings of relays 8–13S2, 8–13S1, resistance TS0, contacts of relay 8CE, signal conductor TS0, contacts of relay 6RE, windings of relays 6–S2, 6–S1, contacts of relay 6–7Z1, resistance 71 to ground. Although current passes through relays 6–7S1 and 8–13S1, these relays do not operate in view of the threshold included in their design which prevents their operation when resistance 71 is in series with the operating path.

A similar circuit may be traced for relay 8–13S4 from negative battery, resistance 151, contacts of relays 8–13RK2, 15Z1, 15RR1, 16DIS14, 10T1, 16G0, 15Z1, windings of relays 8–13S4, 8–13S3, resistance RS0, contacts of relay 8CE, conductor RS0, contacts of relay 6RE, windings of relays 6–7S4, 6–7S3, contacts of relay 6–7Z1, additional contacts of relay 6–7Z1, resistance 72 to ground.

Thus, during quiescent period of concentrator operation sensitive relays 6–7S2, 6–7S4, 8–13S2 and 8–13S4 are all operated.

The release of any of these relays during a quiescent period of concentrator operation would ordinarily be due to a fault condition and may be caused to initiate the operation of emergency transfer relays 6RE and 8CE as shown symbolically by switches 185, 186. Prior thereto, however, it will be useful to examine the circuit operation during the course of a service request call, since so far as concentrator operation is concerned, operating procedure is similar whether the normal signaling path or the emergency signaling path is used.

*Service request call at Substation 201—Normal signal path*

Assuming that a service request is initiated by an off-hook condition at substation 175 the step-by-step PBX 174 responds in a conventional manner by energizing a line finder 183 to hunt for the termination in the PBX unique to substation 175. In accordance with usual practice, the line finder 183 is coupled to a first selector 208 which returns dial tone to the calling customer. At this time, it will be further assumed that the customer at substation 201 is seeking to place an "outside" call as distinguished from an intra-PBX call. In consequence, the customer may dial a predetermined code, for example 9, to reach a selector level on which are terminated the nine outgoing lines 0–8 which in this case extend not directly to a central office but instead to the remote concentrator unit of FIG. 4.

Assuming that line 0 is idle, the selector will automatically effect a connection between the calling customer and line 0. At this time, substation 175 is coupled over conductors T00 and R00 to a horizontal level of the concentrator in a manner similar to those customers who have direct access; i.e., substations 200, etc. which are directly connected to the concentrator remote unit.

A circuit may now be traced for the operation of relay 4–2L00, the line relay unique to conductors T00 and R00. The operating path for this relay may be traced (FIG. 4) from ground, resistance 21, resistance 22, contacts of relay 5–5C000, (normally closed) conductor T00, switching train of PBX 174 and loop to substation 175, conductor R00, additional contacts of relay 5–5C000, winding of relay 4–2L00 to negative battery. At this time, a line identification is made of the calling line and specifically relays 3–3LA00 and 3–3LB00 are operated. Thus, a circuit may be traced from ground, contacts of relay 4–2L00, winding of relay 3–3LA00, contacts of relays 3–3LA00, 3–3LA11, 3–3LA10, 3–3LA06, 3–3LA05, 3–3LA04, 3–3LA00, 4MK, 6–7RRA, resistance 31 to negative battery.

Relay 3–3LB00 operates over a path including the cantacts of relay 3–3LA00. This path includes ground contacts of relay 3–3LA00, resistance 38, contacts of relay 4–2L00, winding of relay 3–3LB00, contacts of relay 3–3LB00, 3–3LB08, 3–3LB04, 3–3LB00, resistance 33 to negative battery. Relays 3–3LA00 and 3–3LB00 lock operated over their own contacts.

The operation of relay 3–3LA00 causes the operation of appropriate signal relays. Operation of relay 3–3LA00 causes the operation of signal relay 6–7S1 over a path from ground, contacts of relay 3–3LA00, 6–7Z1, winding of relay 6–7S1, 6–7S2, conductor TS0, resistance TS0, windings of relays 8–13S1, 8–12S2, contacts of relays 15Z1, 16G1, 16DIS04, 15RR1, 15Z1, 8–13RK2, resistance 151 to negative battery. Obviously, relay 8–13S1 is also operated at this time. As disclosed in my above-referred-to patent, this aspect of the signaling information conveys the group identification of the calling lines, that is, the first group of 50 lines or the second group of 50 lines.

In response to the operation of relay 8–13S1, control operations are performed in the preference control circuit 109 shown in outline form in FIG. 1A allocating preference to the subject service request call. At this time, relay 15M (not shown) at the control unit is operated which provides a path for the operation of a corresponding relay 6–7M at the remote unit over conductor TS1. The operation of relay 6–7M results in the operation of relay 6–7W1 over a path from ground, contacts of relay 6–7RLS, 6–7M, 6–7Z1, 6–7W1, winding of relay 6–7W1 to negative battery. Relay 6–7W1 locks operated over its own contacts. Relay 6CG0 (winding not shown) now operates and in turn causes the operation of relay 6–7CK as disclosed in my above-referred-to patent.

Battery potential is now applied to signal lead RS1 over a path from negative battery, resistance 73, contacts of relay 6–7CK, diode CK to conductor RS1 to indicate that group registration has been registered in the remote unit.

*Trunk selection*

Subseqeuntly the remote unit will transmit additional information relating to the operation of relay 3–3LB00 and information relating to the operation of relay 3–3LA00 and moreover the control unit will transmit information to the remote unit concerning the idle trunk selected to service the call. These operations are treated comprehensively in my above-referred-to patent and need not be considered herein in detail.

Ultimately in response to the transmission of the line information from the remote unit to the control unit and the transmission of the trunk information from the control unit to the remote unit, a group of select magnets 5–5SMA0(A0) and 5–5SMB7(B0) are operated and hold magnet 5–5HMA00 is operated. Moreover, appropriate select and hold magnets in crosspoint network 101 are operated to complete a path from substantion 175 through the switching train of PBX 174, conductors T00 and R00, switch network 102, trunk TK0, crosspoint network 101, sleeve and cutoff relays 103 to the line termination on the CH3 office unique to conductors T00 and R00.

The CH3 office responds in a conventional manner by energizing a dial pulse register and transmitting dial tone to the calling customer who thereupon proceeds to dial the called directory number.

The service request call just described illustrates the dependence on the signal conductors and circuitry of the remaining control equipment for effective operation.

Manifestly, if the control conductors are unavailable as a result of a fault which causes an open-circuit, concentrator operations are imperiled.

In consequence, in accordance with the present invention, facilities are available in response to the failure of conductor TS0 or RS0 to establish an alternate signal path between the remote signal unit of FIG. 6 and the central office signal unit of FIG. 8.

*Detailed description—Emergency signal path*

In essence the transfer of the alternate signal path may be accomplished in a variety of ways. Illustratively, relays 6RE and 8CE may be operated in consequence of the release of relays 6–7S2 and 8–13S2 with suitable provision to insure that release only during a quiescent period is effective to operate the transfer relays. For simplicity relays 6RE and 8CE are shown as being operated by manual switches. It will be noted from FIGS. 6 and 8 that the transfer contacts on relays 6RE and 8CE, respectively, open the normal signal path on conductor TS0 and close the emergency signal path. Similarly, the contacts on relays 6RE and 8CE accomplish transfer on conductors RS0, TS1 and RS1. The operation of relay 8CE in consequence extends a path from the signal conductors at the control unit to repertory dialer 202. The dialer is arranged to proceed in two distinct sequences. In the first a directory number LT1–3370 is dialed, and subsequently as explained herein, another illustrative directory number LT1–5620 is dialed.

When the repertory dialer 202 is initially energized over the contacts of relay 8CE a path is closed as shown symbolically by operation of the manual switch 70 to operate relay 7L0 a conventional line relay in the CH3 office unique to the first repertory dialer appearance. Operation of the latter relay causes the CH3 office to connect a register in the conventional manner and to transmit dial tone to the repertory dialer. The latter is responsive thereto to transmit the digits corresponding to LT1–3370.

The CH3 central office proceeds in accordance with usual practice to extend the path over cable 178 to office LT1 and ultimately to the termination unique to directory number LT1–3370. The latter termination is, in fact, a tie line which extends over cable 179 to PBX 174. When the termination LT1–3370 is seized the switching equipment in the step-by-step PBX responds to trip ringing and apply (the second) dial tone. In response thereto the repertory dialer proceeds to dial a predetermined verification code, for example 4499, as shown symbolically by the opening and closing of manual switch 70. It will be noted in FIG. 2 that the conductors on tie line 179 are extended to selector switch 203, in the step-by-step PBX which switch is coupled to hunting conector 204 through intermediate selector stages (not shown). The latter are in turn coupled to the nine outgoing PBX lines of which only two are shown. It will be assumed that line 0 is idle and that connector 204 seizes conductors T00 and R00 which in turn extend to the horizontal level T00 and R00 of the concentrator remote unit.

Figure 3:
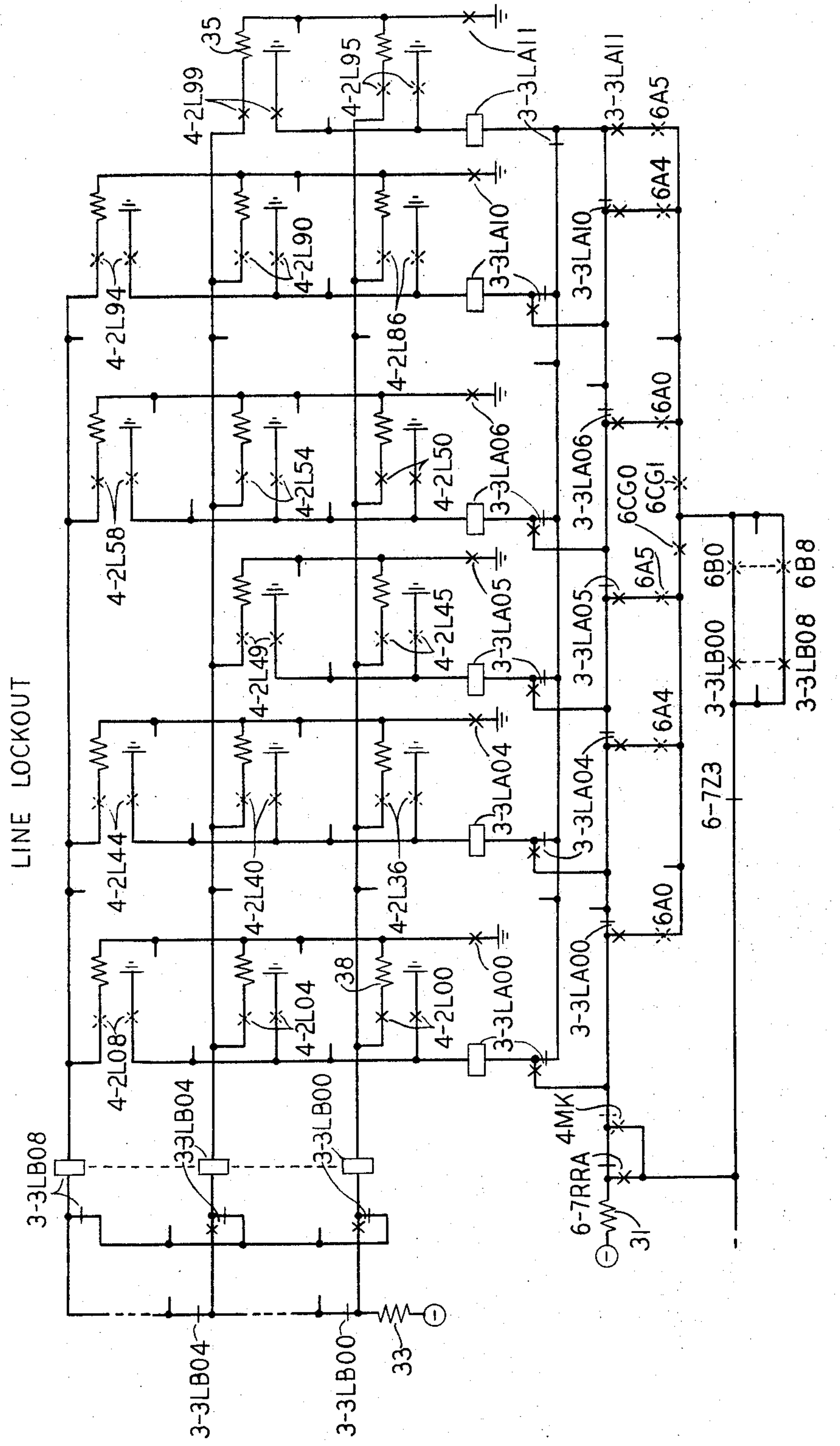
FIG. 3 shows a line lockout circuit for identifying calling lines in the concentrator network of FIG. 4.

The operation of line relay 4–2L00 causes the operation of line lockout circuit of FIG. 3 in a manner similar to that described above for a conventional service request call. Thus, the line lockout relays 3–3LA00 and 3–3LB00 which uniquely identify the calling line are operated in turn causing the operation of selected register relays as well as the select magnets controlled by these relays. Since "reply" signals which are conventionally transmitted over conductor TS1 to operate relay 6–7M are now unavailable a suitable local switching arrangement is necessary to simulate the normal pulses delivered to advance the sequence circuit. A manual switch 65 is shown in FIG. 6 to symbolically accomplish this function. Ultimately select magnets 5–5SMA0(A0) and 5–5SMB9 (B0) are operated whereupon hold magnet 5HMB9A is operated to complete a path from tip conductor T00 and ring conductor R00 through the crosspoint network, cables 40 and 41 and the contacts of relay 6RE to the signaling relays of FIG. 6.

At this time, a path is completed between relays 8–13S1 through 8–13S4 and relays 6–7S1 and 6–7S4 which may be traced from, in the case of relay 8–13S1 over resistance TS0, contacts of relay 8CE, converter 192, conductors 71 and 72, switching train of office CH3, cable 178, switching train of office LT1, cable 179, switching train of PBX 174, conductors T00 and R00, crosspoint network of FIG. 4, converters 190, 191, cable 41, contacts of relay 6RE to relay 6–7S2 and remaining signal circuitry at the remote unit. A similar path may be traced for conductor RS0.

Thus, a complete path now extends between the signal circuitry of the remote unit and the signal circuitry of the control unit to substitute for conductors TS0 and RS0 which formerly joined those circuits directly.

It now remains to establish an additional path to substitute for conductors TS1 and RS1 (if any of these conductors have failed). The procedure is similar to that described above and includes seizure by the repertory dialer of the second dialer line appearance in the CH3 office. Referring to FIG. 7, a path extends over conductors 74 and 75 to operate relay 7L1 in the CH3 office. The repertory dialer responds to dial tone transmitted by the CH3 office to send digits representing directory number LT1–5620. This procedure is shown symbolically by the opening of manual switch 73. In the manner described above, termination LT1–5620 is seized and a connection extended over tie line 187 to PBX 174 which responds by delivering the second dial tone to the repertory dialer. Again, the verification code 4499 is transmitted to advance selector 212 to terminal 9 whereupon the hunting connector 205 selects the first idle outgoing PBX line for seizure. It will be assumed that line 1 is idle and that conductors T01 and R01 (not shown) are seized. Ultimately a relay unique to this line pair in network 102 is energized and line identification is made which ultimately causes the operation of the appropriate select magnets as shown in FIG. 5. Thereafter, hold magnet 5HMB9B is operated to connect conductors T01 and R01 through the crosspoint network and vertical V9B, converter 191, cable 41, contacts of relay 6RE to conductors TS1 and RS1. As a result, a second path has been extended as described as an alternate data channel in lieu of conductors TS1 and RS1. At this time, concentrator operation may proceed as described above for a normal service request call with the exception that all information is transferred between the remote unit and the control unit over the emergency alternate route rather than the direct route.

Although, illustratively, the extension of two independent alternate paths has been shown to permit the processing of information over the two signal pairs TS0, RS0, TS1 and RS1, it is, of course, understood that fewer or more paths may be established in accordance with the requirements of a particular signaling facility.

Although, illustratively, communication between a central office control unit and a remote concentrator network has been shown, it is understood that the invention encompasses the extension of an emergency data link over conventional switched channels between two communicating devices wherein one of the devices is identified by a unique directory number designation or address. In response to the failure of the normal link coupling the two devices, an automatic signaling unit coupled to the other device will transmit the directory code designation through the national switching network to extend an alternate link over any available path. The remarkably extensive "back-up" protection thus afforded to the data link is manifest despite the fact that no portion of the back-up or switched paths is exclusively reserved or "dedicated" to data link usage.

It is to be understood that the above-described arrangements are illustrative of the application of the principles of the invention. Numerous other arrangements may be devised by those skilled in the art without departing from the spirit and scope of the invention.

What is claimed is:

1. In combination in a communication switching system, a central office signaling unit and a remote signaling unit, a normal signaling path interconnecting said office unit with said remote unit for conveying a control signal therebetween, and means automatically effective upon an undesired electrical condition on said normal path for making a call to extend an emergency signaling path over which said control signal is conveyed between said units comprising (a) means for sending a directory number and a verification code, (b) switching means responsive to the receipt of said number for controlling the establishment of a first portion of said emergency path, and (c) means controlled by said code during the extending of said emergency path for verifying that only said call is permitted access to said remote unit and including means responsive to the receipt of said code for controlling the establishment of a remainder portion of said emergency path.

2. The invention claimed in claim 1 further comprising an intermediate office having a switching network and a private branch exchange having a switching network, said switching means includes said office and being responsive to the receipt of said number for establishing said first portion of said emergency path through said office network, and said verifying means includes said exchange and being responsive to said code for establishing said remainder portion of said emergency path through said exchange network for conveying said control signal between said units.

3. The combination of claim 1 also including detection means at said remote and central office units for independently detecting said undesired condition, said central office detection means being effective to energize said sending means for sending said number and code and including means for coupling said office unit to said first portion of said emergency path, and said remote unit detection means being effective for coupling said remainder portion of said emergency path to said remote unit to interconnect said units via said emergency path.

4. The combination of claim 3 wherein said remote and office units include means for transmitting a marginal signal over said normal path, said remote and office detection means each comprise apparatus connected to said normal path for monitoring said marginal signal conveyed thereover, and said apparatus being activated in the event said marginal signal is interrupted indicating said undesired electrical condition for causing the extension of said emergency path.

5. Equipment for establishing an emergency signaling path to a remote line concentrator unit in a switching system which comprises, a central office having an office switching network, a plurality of speech trunks extending from said office to said remote unit, a plurality of substations greater in number than said trunks, control circuitry at said remote unit including a remote switching network controlled by said office for establishing connections via said remote network between individual ones of said trunks and substations, a normal signaling path connected between said control circuitry and said office for conveying a control signal to direct the establishment of said connections, and said equipment comprises means effective during an undesired electrical condition on said normal path for making a call and thereby controlling the extension of said emergency signaling path over which said control signal is conveyed comprising (a) repertory dialer at said office for sending a directory number indicative of said remote unit followed by a vertification code, (b) switching means including said office network responsive to the receipt of said number for establishing a first portion of said emergency path which includes a connection through said office network, and (c) means effective during the extension of said emergency path for verifying that only said call is permitted access to said remote unit and including means responsive to the receipt of said code for controlling the establishment of a remainder portion of said emergency path which includes a connection through said remote network.

6. The invention claimed in claim 5 further including a private branch exchange having a switching network connected to said unit, an intermediate office having a switching network that is connected to said exchange network and to said central office, said switching means includes said intermediate office and being responsive to said number for establishing a connection from said office to said exchange via said intermediate office network for establishing said first portion of said emergency path, and said verifying means includes said exchange and being responsive to said code for establishing a connection from said intermediate office to said unit via said exchange network to establish the remainder portion of said emergency path for conveying said control signal from said office to said unit.

7. The invention claimed in claim 5 further including signaling circuits at said office and unit connected to said normal path for transmitting and receiving said control signal, and transfer means at said office and unit independently activated upon said undesired electrical condition on said normal path for connecting said circuits respectively to said office and remote networks and including means for disconnecting said circuits from said normal path.

8. The invention recited in claim 7 including a plurality of signal detectors in said office and unit signaling circuits, wherein said normal path comprises a plurality of signaling channels each of which is associated with an individual one of said signal detectors at said office and unit, said detectors being normally operated during the time said control signal is conveyed over said normal path, and means operative upon the release of one of said detectors indicating said undesired electrical condition for activating said transfer means and said repertory dialer to establish said emergency path to substitute for said normal path during the emergency.

References Cited

UNITED STATES PATENTS

| | | | |
|---|---|---|---|
| 1,673,212 | 6/1928 | Stehlik | 179—18 |
| 3,001,027 | 9/1961 | Armstrong et al. | 179—18 |
| 3,121,141 | 2/1961 | Gohorel | 179—18 |

KATHLEEN H. CLAFFY, *Primary Examiner.*